United States Patent [19]

Brunken et al.

[11] Patent Number: 4,752,994
[45] Date of Patent: Jun. 28, 1988

[54] APPARATUS FOR REMOVING BURRS FROM WELDED MATERIAL

[75] Inventors: Walter R. Brunken, Medinah; William J. Dempsey, Lombard, both of Ill.

[73] Assignee: Addison Machine Engineering, Inc., Addison, Ill.

[21] Appl. No.: 923,912

[22] Filed: Oct. 28, 1986

Related U.S. Application Data

[63] Continuation-in-part of Ser. No. 599,240, Apr. 11, 1984, Pat. No. 4,622,729.

[51] Int. Cl.⁴ .................. B23P 15/44; B23P 23/04
[52] U.S. Cl. ............................. 29/33 A; 29/33 T; 409/140
[58] Field of Search ............... 29/33 T, 81 F, 81 G, 29/33 A; 409/292, 29 B, 300, 310, 315, 336, 346, 140

[56] References Cited

U.S. PATENT DOCUMENTS

| | | |
|---|---|---|
| 152,585 | 6/1874 | Wells . |
| 166,337 | 8/1875 | Brown . |
| 1,954,511 | 4/1934 | Adam, Jr. . |
| 1,973,428 | 9/1934 | Comstock . |
| 2,233,928 | 3/1941 | Weaver . |
| 2,243,197 | 5/1941 | De Flore . |
| 2,601,812 | 7/1952 | Honen . |
| 2,893,292 | 7/1959 | Naperola ................ 409/140 |
| 3,055,102 | 9/1962 | Shaw et al. ............. 409/310 X |
| 3,168,004 | 2/1965 | Zavodny et al. ........ 409/310 X |
| 3,482,295 | 12/1969 | Trent . |
| 3,564,683 | 2/1971 | Schedler . |
| 4,221,511 | 9/1980 | Stefan et al. . |

Primary Examiner—Eugene F. Desmond
Attorney, Agent, or Firm—Myers & Ehrlich, Ltd.

[57] ABSTRACT

A scarfing apparatus for removing a weld bead from a tube being produced by a continuous method wherein the tube enters one end of a rotatable hollow spindle which supports a tool bit. The tool bit has an arcuate shape having a segment which extends 180° or less about the periphery of the tube. The spindle oscillates rotationally causing the tool bit to rock back and forth across the surface of the moving tube to remove the weld bead. The tool bit is formed of carbide steel containing tantalum, titanium and cobalt. The tool bit has a forward face portion and a bottom face portion which define a tooling edge at their intersection. The bottom face portion slopes upwardly at an angle of approximately 3° to reduce friction on the tube. For use with carbon steel tubing, a bit is used having a forward face portion angled approximately 15° from the vertical. For use with stainless steel or aluminized material, a bit is used having a forward face portion angled back approximately 21° from the vertical. The forward face portion is smoothed to no rougher than approximately 12-16 microinches to enhance chip flow. The bottom face portion is smoothed to no rougher than approximately 24-30 microinches or smoother to provide a tooling edge without irregularities. A tool holder supporting the tool bit is secured to the spindle by securement bolts and has a locating aperture therein which receives a locating member mounted on the spindle to ensure correct alignment of the tool holder relative to the spindle during assembly.

32 Claims, 5 Drawing Sheets

FIG-3

FIG_5

FIG_6

FIG_7

APPARATUS FOR REMOVING BURRS FROM WELDED MATERIAL

BACKGROUND OF THE INVENTION

Related Applications

This application is a continuation-in-part of U.S. patent application Ser. No. 599,240 filed Apr. 11, 1984, now U.S. Pat. No. 4,622,729, issued Nov. 18, 1986.

Field of the Invention

This invention is generally directed to the removal of a weld bead from the outside surface of a tube by means of scarfing and, more specifically, to an apparatus for removing a weld bead from a tube being produced by a continuous method.

Description of the Prior Art

Various methods and apparatus are known for removing weld beads from tubes. For example, U.S. Pat. No. 1,973,877 describes an apparatus using a pair of rotary shears which cooperatively removes the weld bead from a tube as the tube passes in a scarfing contact with the shears. One disadvantage of the apparatus is in the use of two shears which wear out unevenly and have to be replaced quite often.

Another form of removing a weld bead is described in U.S. Pat. No. 3,755,884 which uses a stationary scarfing tool which is positioned in a scarfing contact with a moving tube as it is being formed on a tube-forming machine. Since the scarfing tool removes the weld bead by a brute force, the tube is subject to deformation. Furthermore, the scarfing tool wears out fairly rapidly and requires frequent relacement.

A better apparatus for removing weld beads is described in U.S. Pat. No. 1,954,511, wherein in the embodiment shown in FIGS. 5 and 6, a ring-shaped cutter, rotatably mounted, removes the weld bead from a tube as it passes through the center of the cutter. The main objection to this type of cutter is that, should the cutter perform improperly and have to be removed, it is necessary to shut down the tube-forming apparatus so that the ring cutter can be replaced.

Additionally, the angles of the faces of the cutter result in a tool bit having a tooling edge which is vulnerable to blunting. The face of the cutter facing the tube engages the tube beyond the tooling edge, resulting in unnecessary friction, inefficiency, and wear on the cutter. Also, differences in the mechanical qualities of the material which forms the tube being worked are not taken into account in the earlier designs.

SUMMARY OF THE INVENTION

Since it has been found that a malfunction in a ring-shaped cutter requires the shut down of the tube-forming apparatus in accordance with the present invention, there is provided a scarfing apparatus employing a rotatably supported scarfing cutter which can be readily replaced without stopping the operation of the apparatus continuously forming a tube.

It is the principal object of this invention to provide an apparatus for scarfing the weld bead from the outside surface of a welded tube without deforming the tube under the action of the scarfing tool.

It is another object of this invention to provide an apparatus for scarfing the weld bead from a welded tube without requiring cooling of the scarfing tool.

A still further object of the invention is to provide means for oscillatingly supporting a scarfing tool to provide uniform scarfing contact with the tube.

Another object of the invention is to provide means on the scarfing apparatus to support the scarfing tool in a quick-release manner.

A still further object of the invention is to provide an oscillatingly-supported scarfing unit which not only removes the weld bead, but provides polishing to the surface of the tube.

It is an object of this invention to provide a tool bit having faces at angles which improve the life of the tool bit and flow of the scarfed material over the forward face of the tool bit.

It is an object of this invention to provide a surface rearward of the frontal tooling edge of the tool bit which slopes away from the tube to reduce friction during the scarfing action.

It is an object of this invention to provide for angles of the frontal face on the tool bit which provide optimal operation with tubing of materials with differing mechanical properties.

DESCRIPTION OF THE PREFERRED EMBODIMENT

Figure 1:
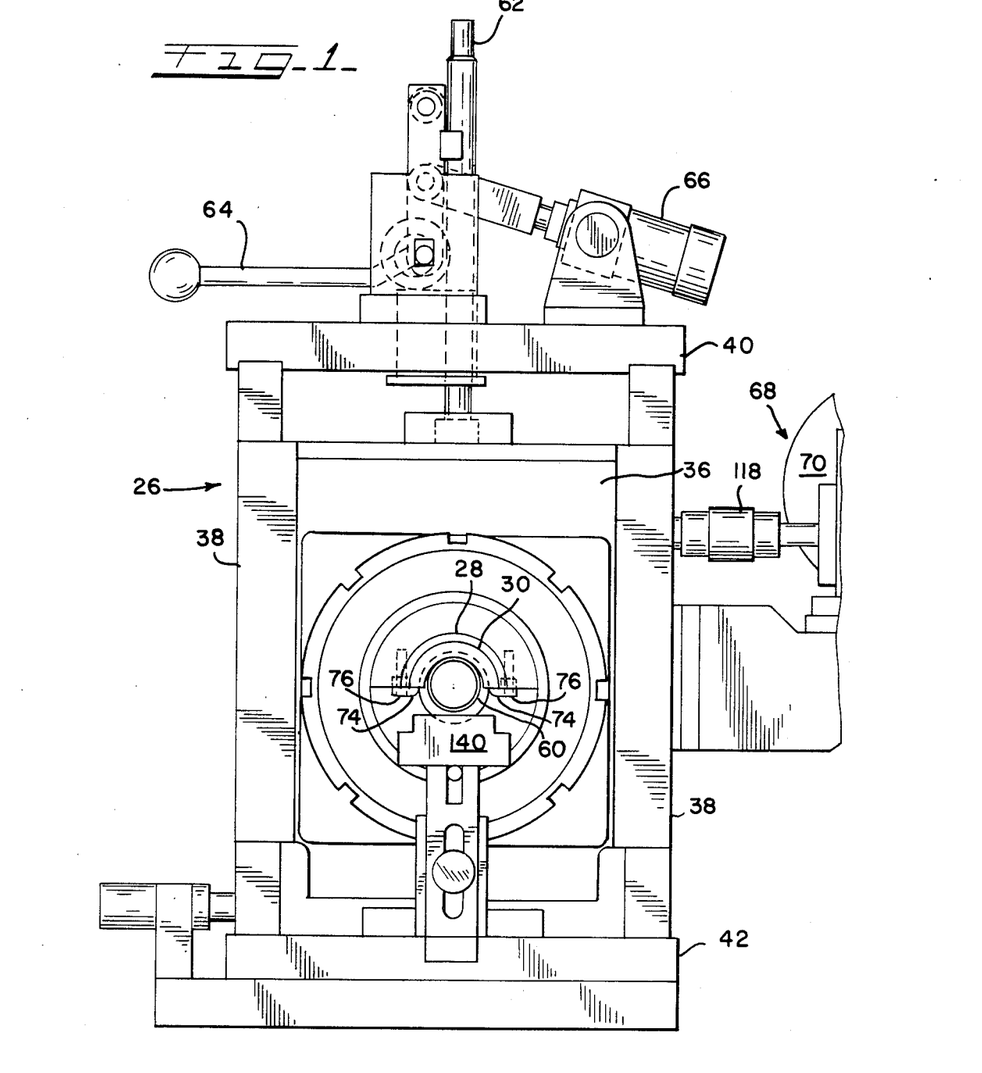
FIG. 1 is an end view of a scarfing apparatus provided with an oscillatingly-supported scarfing tool.
Figures 2, 4:
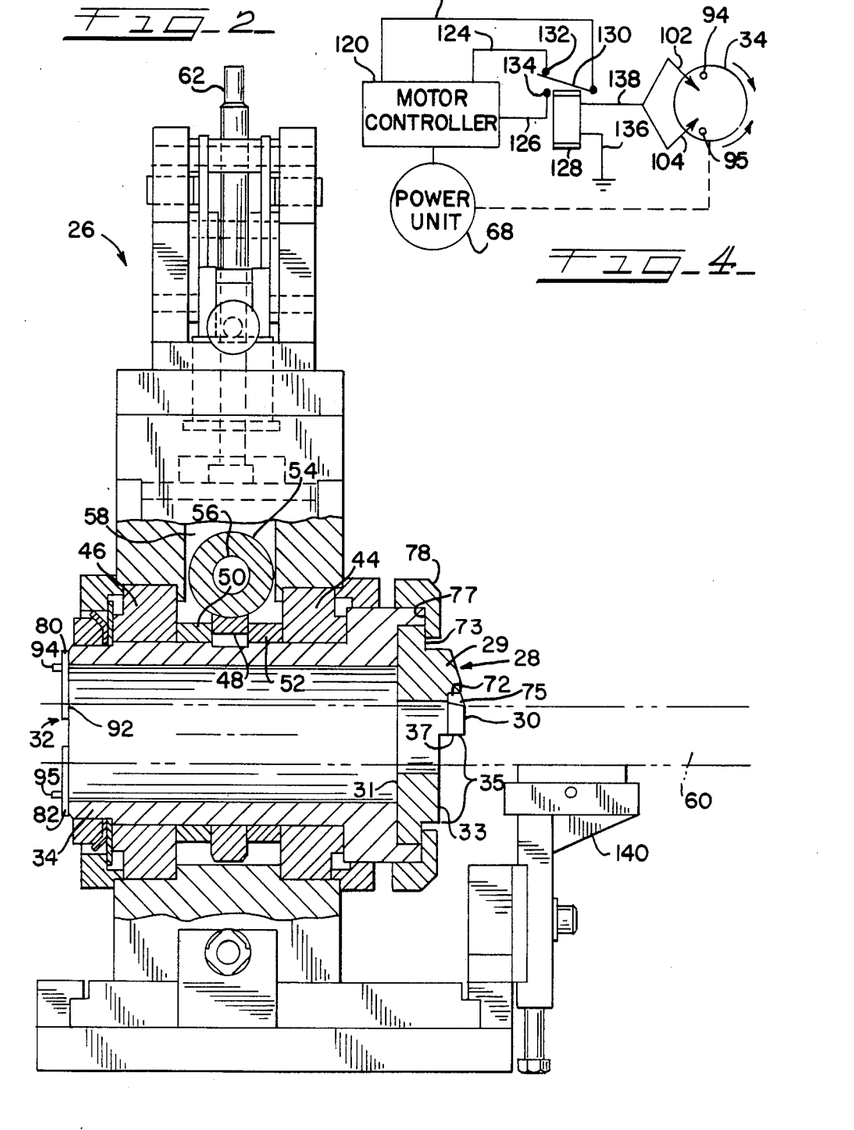
FIG. 2 is a sectional view of the scarfing apparatus.
FIG. 4 is a circuit schematic adapted for providing oscillating motion to the scarfing tool.
Figure 3:
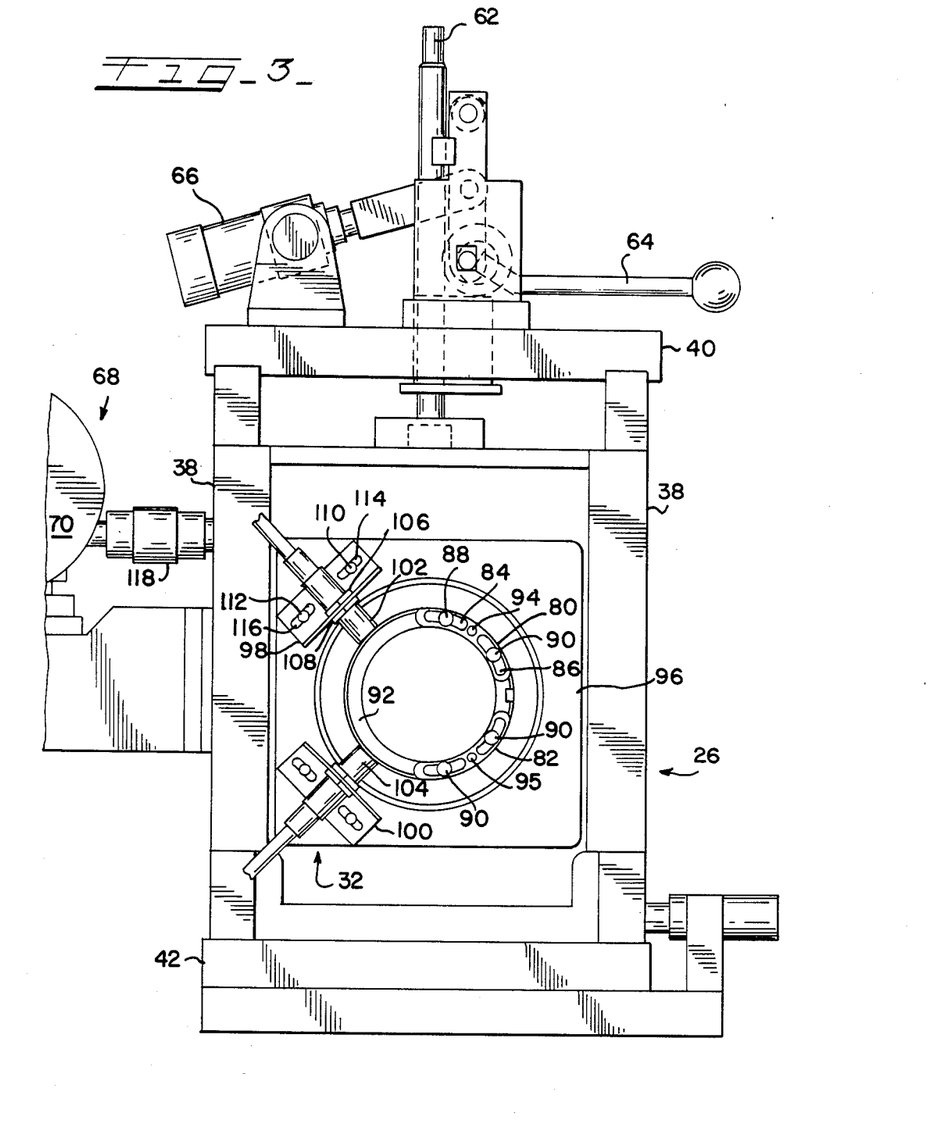
FIG. 3 is the opposite end view of the scarfing apparatus.

Referring to FIGS. 1 through 3, the preferred embodiment of the invention is concerned with a scarfing apparatus 26 which has been modified to use an improved scarfing tool holder 28 supporting an arcuate tool bit 30 which is adapted to remove a weld bead from a continuously formed tube 60 shown in phantom in FIG. 2 entering into the scarfing apparatus 26 and exiting the apparatus adjacent a sensing device 32 which is responsible for controlling the rotary movement of a spindle 34. The mechanical features of the scarfing apparatus 26 will not be discussed in detail inasmuch as the scarfing apparatus is well known, for example, as manufactured by Addison Machine Engineering, Inc. of Addison, Ill.

The scarfing apparatus 26 comprises a bearing block 36 movably supported in a vertical direction between frame members 38 spaced between a top plate 40 and a bottom plate 42. The bearing block 36 furnishes support for the spindle 34 as shown in FIG. 2, rotatably supported by bearings 44 and 46. The central portion of the spindle 34 on the periphery thereof is provided with a driven worm gear 48 which is spaced from the bearings 44 and 46 by spacers 50 and 52, respectively.

The driven worm gear 48 is actuated by a driving worm gear 54 supported on a shaft 56, the ends of which are supported by blocks, such as block 58.

As shown in FIG. 1, the bearing block 36 supporting the spindle and the associated scarfing tool holder 28 and the arcuate tool bit 30 can be positioned in respect to the tube 60 by means of a threaded member 62 so that a proper scarfing action may be maintained on the tube 60 as it moves through the apparatus 26.

If it is necessary to remove the scarfing tool holder 28 and its associated tool bit 30 away from the tube 60, this can be done by a quick release handle 64, or it can be automatically provided for by an air cylinder 66.

The driving worm gear 54 is actuated by a power unit 68 comprising a D.C. motor and speed reducer 70, as viewed in FIG. 3.

As best viewed in FIG. 1, the scarfing tool holder 28 has substantially a semi-circular shape having a substantially circular-shaped seat 72 (FIG. 2) adapted to receive a substantially semi-circular-shaped tool bit 30 which is secured to the tool holder 28 by a pair of brackets 74 and bolts 76, the bracket-bearing tool bit having supporting lips 75. As best viewed in FIG. 2, the scarfing tool holder 28 is, in turn, supported on the spindle 34 by a tool holder locking nut 78. The tool holder 28 is made from a plate 29 having a proximal side 31 secured to an end of the spindle 34 and a frontal side 33 having an undercut portion 35, the remaining portion of said tool holder defining an overhang 37. The frontal side 33 has a peripheral shoulder 73 which is abutted by an interior shoulder 77 of the locking nut 78.

Figure 8:
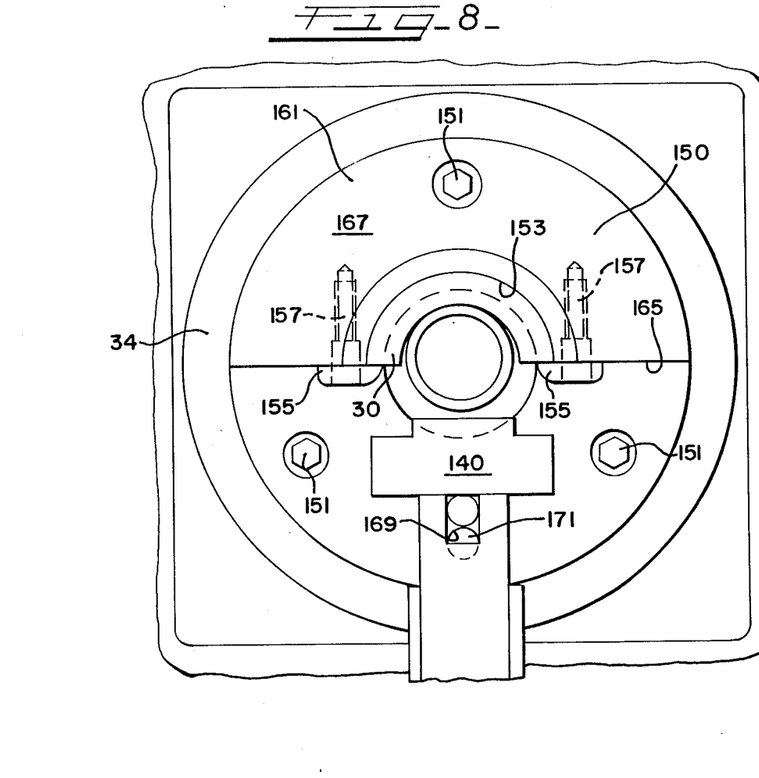
FIG. 8 is a partial view as in FIG. 1, but disclosing an alternate embodiment of the tool holder.
Figure 9:
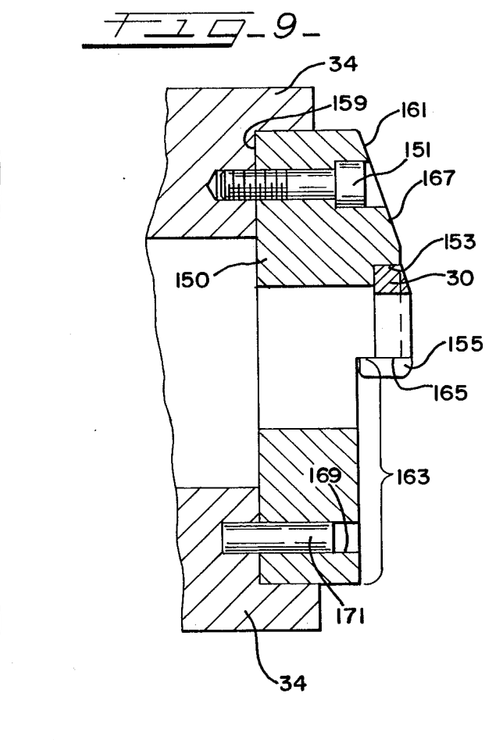
FIG. 9 is a sectional view as in FIG. 2 but showing the tool holder of FIG. 8.

FIGS. 8 and 9 show an alternate design of tool holder 150 to be supported on spindle 34. Tool holder 150 is supported on spindle 34 by securing means in the form of three bolts 151 extending through tool holder 150 and secured in the end of the spindle 34. Tool holder 150 has a semicircular-shaped seat 153 adapted to receive tool bit 30 which is secured to the holder 150 by a pair of insert clamps 155 and screws 157. As best viewed in FIG. 9, the scarfing tool holder 150 has a proximal side 159 secured to an end of the spindle 34 and a frontal side 161 having an undercut portion 163, the remaining portion of the tool holder 150 defining an overhang 165. The frontal side 161 has an angular surface 167.

To ensure correct orientation during assembly, tool holder 150 is provided with coacting locating means in the form of aperture means 169 which receives locating pin 171 supported on spindle 34 only when the holder 150 is in the correct mounting position for operation.

The other end of the spindle 34, as shown in FIGS. 2 and 3, supports a pair of actuator brackets 80 and 82. Each actuator bracket, such as actuator bracket 80, has an arcuate shape provided with a pair of arcuate slots 84 and 86 which receive a pair of securing members 88 and 90, respectively, which members secure the actuator bracket 80 to an end 92 of the spindle 34. The arcuate slots 84 and 86 allow the actuator bracket to be adjustably positioned on the spindle end 92. Each actuator bracket, such as actuator bracket 80, is provided with an actuator pin 94 which extends outwardly of the actuator bracket 80, as shown in FIG. 2. The actuator bracket 82 supports a position indicator member, such as an actuator pin 95. These pins establish the range of the oscillatory rotational movement of the spindle, as will be discussed later.

Mounted on a plate 96, as shown in FIG. 3, is a pair of sensor brackets 98 and 100 supporting a pair of the sensors 102 and 104, respectively. The position of the sensors, such as sensor 102, can be adjusted radially with respect to the spindle 34 by adjustable members 106 and 108. The tangential position of each sensor, such as sensor 102, can be obtained by loosening securing members 110 and 112 so that a sliding movement of the sensor bracket 98 can be obtained through its slots 114 and 116. The sensors 102 and 104 are actually commonly known proximity switches, such as type TL-X 5 Y1 manufactured by Omron Company. the sensors 102 and 104 and the actuator brackets 80 and 95 comprise the sensing device 32. The brackets and the supported sensors are mounted at 90° to each other.

When the power unit 68 is energized, rotary power at a reduced speed is applied by a coupling 118 to the shaft 56 supporting the driving worm gear 54 which, in turn, transmits rotary power to the driven worm gear 48 mounted on the spindle 34 to thereby provide rotational movement to the spindle. The motion transmitted to the spindle 34 is of an oscillating nature, that is, the spindle will rotate first in one direction and then in the opposite direction, as will now be discussed more fully.

Referring to FIG. 4, there is shown a basic control circuit for controlling the power unit 68 in such manner as to apply partial rotational movement in an oscillating manner to the spindle 34 which, as has been discussed previously, supports the actuator pins 94 and 95 which, as the spindle is rotatably moved, interact with the sensors 102 and 104, respectively.

As shown in FIG. 4, the power unit 68 is controlled by a motor controller 120 which is coupled by leads 122, 124, and 126 to a latching relay 128. The relay 128 has a movable contact adapted to make contact with a stationary contact 132 terminating the lead 124 and to make contact with a stationary contact 134 terminating the lead 126. The internal coil of the relay 128 has one of its leads 136 connected to ground and the other lead 138 connected to the sensors 102 and 104.

When the motor controller 120 is energized, power is applied by the power unit to the spindle 34 to rotate it in a counter-clockwise direction because of the contact established between the movable contact 130 and the lead 124. As the spindle 34 rotates in the counter-clockwise direction, the actuator pin 94 will reach a position adjacent the sensor 104 which, at this time, will send a pulse to the relay 128 to unlatch the relay and cause the movable contact 130 to establish contact with the stationary contact 134, thereby latching the relay in a new position. When this happens, a signal is applied over the lead 126 to the motor controller 120 to change the direction of D.C. current applied to the power unit 68, thereby causing the power unit to reverse its rotational direction and apply a clockwise rotational movement to the spindle 34. As the spindle 34 moves in the clockwise direction, the actuator pin 95 will reach a position opposite the sensor 102 to trigger a pulse to unlatch the relay 128, causing thereby the movable contact 130 to establish contact with the lead 124, to thereby cause the motor controller 120 to reverse the D.C. current applied to the power unit 68 which, in turn, will reverse the rotational movement of the spindle 34.

As viewed in FIG. 1, the arcuate tool bit 30 preferably has a semi-circular shape and, therefore, the location of the actuator pins 94 and 95 should be adjusted to establish a less than semi-circular rotational movement of the spindle 34, by loosening the securing members 88 and 90 to adjust the positions of the actuator brackets 80 and 82 to establish the desired rotational range. Of course, it is apparent that the arcuate rotational range of movement of the spindle 34 can be adjusted to be less that 180°.

As shown in FIG. 2, as the tube 60 moves across a support 140 and enters into the interior of the spindle 34, the weld bead would be in the uppermost position of the tube 60 and would come in contact with the arcuate tool bit 30 as it oscillates to provide scarfing action to the tube 60 to remove the weld bead. Since the tool bit 30 oscillates back and forth, it provides not only a scarfing action, but also applies a polishing action to the tube 60 passing through the spindle 34. In the event that during this operation the tool bit 30 is damaged or becomes worn out, an operator of the scarfing apparatus 26 will momentarily shut down the continuous tube welding operation, thus shutting down the motor controller 120 and operate the quick-release handle 64 to move the bearing block 36 upwardly, thereby moving the tool bit 30 out of contact with the tube 60. Thereafter, bolts 76 are loosened to permit the brackets 74 to release the defective tool bit 30. A new tool bit is then inserted into the seat 72 and the bolts are tightened to lock the new tool bit in position. Thereafter, the motor controller 120 is placed in operation as the welding process resumes and the quick-release handle 64 is operated to lower the bearing block 36 to re-establish contact between the new tool bit 30 and the tube 60 to continue with the weld bead removal.

During the short time required for the replacement of the defective tool bit, a portion of the tube 60 will pass through the spindle without having the weld bead removed from the tube. This short length of unscarfed tube can be processed by manual operation.

The motor controller 120 can be any one of such control apparatus commercially available, for example, a regenerated D.C. drive circuit, Model SECO "6504-NO" manufactured by Seco Electronics Corporation of Lancaster, S.C. The power unit 68 includes a D.C. motor having a rating of one-third H.P. and a speed reducer having a speed reduction of 1.2 rpm to 35 rpm, both of the foregoing being commercially available.

As described, the oscillatory rotational movement imparted to the spindle 34 is provided by a control means comprising a motor controller 120 and co-acting means having two co-acting sets such as pins 94 and 95, and respective sensors 102 and 104.

Figure 5:
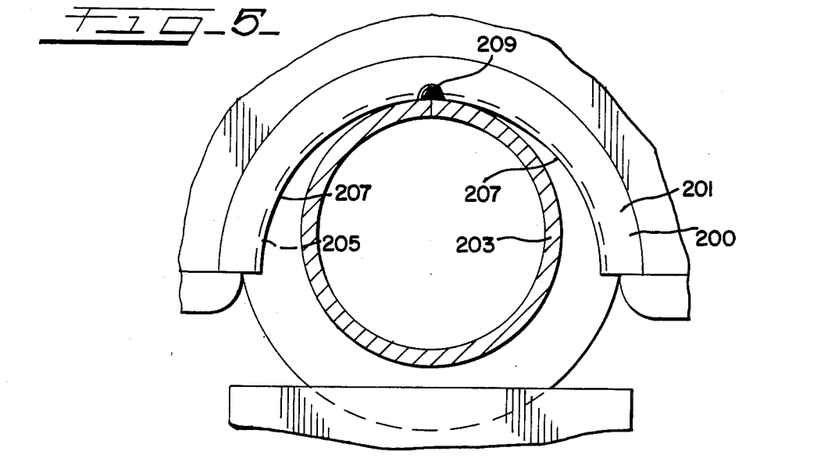
FIG. 5 is a partial section view along line 5—5 showing a tool bit for the scarfing apparatus for use with tubing of carbon steel or similar material.
Figure 6:
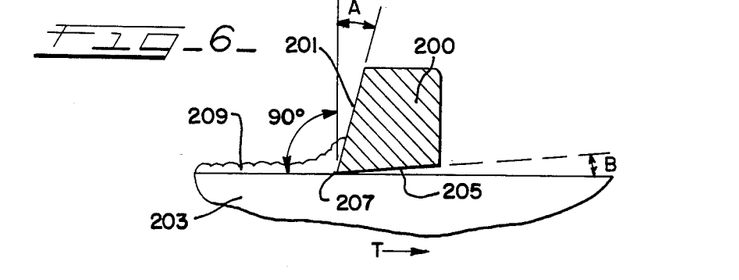
FIG. 6 is a section view taken along line 6—6 in FIG. 5.

FIG. 5 shows a tool bit 200 viewed from the front, that is, viewed in the direction of movement of the tube through the apparatus. FIG. 6 shows a cross-section of tool bit 200.

FIG. 6 shows the cross-sectioned shape of bit used for scarfing carbon steel tubes. The bit 200 has a forward face on surface portion 201 which slopes rearwardly and upwardly from the tube 203 and defines an obtuse angle therewith. This obtuse angle may also be described as angle A from a plane extending perpendicularly with respect to the tube. The bit 200 also has a trailing downwardly-facing face or surface portion 205 which slopes upwardly away from the upper surface of the tube 203 at an angle B. To keep the angles A and B constant with respect to the tube 203 throughout the oscillating movement of the bit 200, the surfaces of faces 201 and 203 are shaped substantially as portions of cones of rotation about the axis of rotation of the spindle.

The conic faces 201 and 203 intersect to form an arcuate tooling edge portion 207 which engages the weld bead 209 on the tube 203 and scarfs the bead as the bit reciprocates.

Tool bit 200 is used to scarf carbon steel tubing or other tubing formed of material having similar mechanical characteristics to carbon steel. As the tube 203 proceeds in the direction indicated by arrow T in FIG. 6, the bead 209 is scarfed from the tube 203 by the reciprocating edge portion 207. The material in the bead 209 separates from the tube and slides upwardly as chip on the front faces 201 of the bit 200. When angle A is small, front face 201 is close to a plane perpendicular to tube 203, resulting in considerable resistance to the flow of the chip up the front face 201 and movement of the tube 203 applied to the bead 209. This reduces the efficiency and quality of the scarfing actions on the tube 203 and affects the operational life of the bit 200. As the angle is increased, flow of the chip is enhanced and resistance to movement of the tube 203 is reduced. This results in more efficient scarfing action by the tool bit. However, as angle A is increased, the angle between front face 201 and bottom face 205 is decreased, resulting in a more acute angle supporting the tooling edge portion 207. The more acute the angle, the shorter the operative life of the tool bit, 200 and the more vulnerable the tooling edge portion 207 is to being blunted or chipped, especially when the tool bit 200 encounters the butt welds joining longitudinal segments of tube.

The optimal value of A to maximize tool life with a good and efficient scarfing action on the tube depends on the material properties of the tube. For tubing composed of carbon steel or similar material, the angle for the best performance is 15° (105° from the tube). The bit 200 may be used to scarf tubes of a number of carbon steels such as those having AISI-SAE designations 1008 (chemical composition of maximum 0.1% carbon and in the range 0.3 to 0.5% manganese), 1010 (0.08 to 0.13% carbon, 0.3 to 0.6% manganese), 1055 (0.5 to 0.6% carbon, 0.6 to 0.9% manganese), 1065 (0.6 to 0.7% carbon, 0.6 to 0.9% manganese). Other types of carbon steel may also be used with the bit of this invention with analogous positive results.

Figure 7:
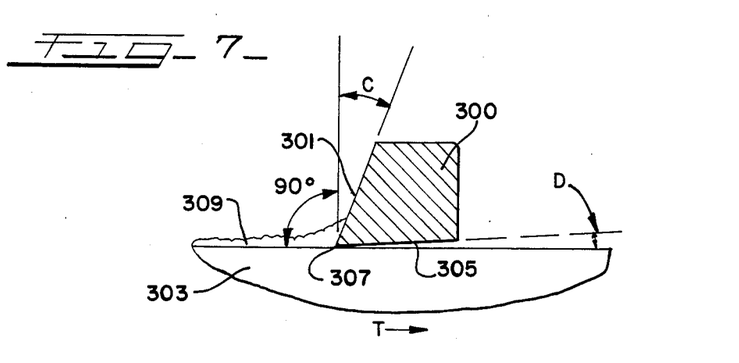
FIG. 7 is a section view as in FIG. 6, but showing a tool bit for use with tubing of stainless steel or similar material.

FIG. 7 shows a section view as in FIG. 6 of an alternate embodiment tool bit 300 for use with stainless steel or aluminized material tubing. Although many grades of stainless steel may be used with positive results with the bit 300, the bit 300 is intended for use primarily with ferritic stainless steels in the 400 series stainless steels, as defined by the American Steel Institute, and especially stainless steel 409 which has a chemical composition of a maximum of 0.08% carbon, 1% manganese, 1% silicon, 0.045% phosphorous, 0.045% sulfur, chromium in the range of 10.5 to 11.75%, and titanium in the range of from six times the percentage of carbon to 0.75%. Bit 300 is also appropriate for use with tubing of aluminized material, or of galvanized steel, and also for other stainless steels in the 300 series.

Bit 300 has a forward face portion 301 sloping upwardly and rearwardly at an angle C from a transverse plane perpendicular to the tube 303. A downward-facing face portion 305 slopes rearwardly and upwardly from tooling edge portion 307 at the intersection of front and downward-facing face portions 301 and 305. Face portion 305 slopes upwardly and rearwardly from tooling edge portion 307 at an angle D from upper surface of the tube 303.

In the alternate embodiment for use with tubing composed of stainless steel or similar material, the angle C which provides the optimal combination of tool life and scarfing efficiency is 21° (111° from the tube) with a machining tolerance of plus or minus 1°,. However, considerable improvement over the prior art is achieved by use of an angle C between about 18° and 22° (108° to 112° from the tube).

Referring again to FIG. 6, the separated chip of the weld bead slides up the face portion 201 of the bit 200 and away from the tube 203. The chip encounters friction as it slides up the face portion 201, and if the friction is high enough, the flow of the chip will be retarded enough to interfere with the scarfing of the tube by the tooling edge portion 207. Accordingly, it is desirable to provide a face portion 201 which is as smooth as possible to facilitate flow of the chip away from the point of contact of tooling edge portion 207 with tube 203. The face portion 201 in the embodiment shown in FIG. 6 is ground and/or polished to a smooth surface. Surface roughness is measured in microinches (millionths of an inch). The roughness measurement indicates the average of the deviation of the peaks of the actual surface of the material from the mean line or nominal surface of the material. The face portion 201 may be made even smoother than 12 to 16 microinches if additional cost considerations allow. A maximum roughness of the front face portion 201 for acceptable chip flow is in the range of 20 microinches.

The tooling edge portion 207 of bit 200 is located at the intersection of front face portion 201 and second face portion 205. The tooling edge itself is arcuate and defined by the intersection of the conic surfaces of faces 201 and 205. It is important that the tooling edge be free of nicks, cracks, and irregularities. Irregularities in the tooling edge render the bit 200 considerably more vulnerable to damage, reduce efficiency of the scarfing action, and result in a less smooth finish on the tube. To produce a very smooth surface, face portion 205 is ground and/or polished to a smoothness of 24 to 30 microinches or smoother. Combined with the smoothness of face portion 201, described above, the smoothness of face portion 203 provides tooling edge portion 207 with an arcuate tooling edge which is substantially free of irregularities.

Similar ranges of smoothness are used in the alternate embodiment shown in FIG. 7. Face portion 301 is ground or polished to a smoothness of 12 to 16 microinches or smoother to facilitate chip flow, and face portion 305 is ground or polished to a smoothness of 24 to 30 microinches or smoother. The resulting tooling edge is relatively free of irregularities, and this produces similar beneficial results to those produced by bit 200 shown in FIG. 6.

The downward-facing portion 205 of the embodiment shown in FIG. 6 slopes away from the tube 203 and rearwardly from the tooling edge portion 207. When angle B is 0°, the downward facing portion 205 engages the top surface of the tube, resulting is unnecessary friction in the apparatus. As angle B is increased, friction is reduced. However as angle B increases, the angle between face portions 207 and 205 decreases and the tooling edge portion 207 receives less and less structural support from the bit 200, and becomes consequently more vulnerable to damage, reducing the life of the bit 200. Also, as angle B increases, the tool bit 200 experiences a tendency to develop a vibration or a chatter as the tooling edge portion 207 irregularly digs into the weld bead 209. Accordingly, it is desirable to slope face portion 205 at an angle B which is large enough to reduce bit friction on the tube, but small enough to give necessary support to the tooling edge portion 207 and to prevent chatter. Bit 200 produces best results when angle B is equal to approximately 3°. A significant improvement over the prior art is accomplished in the general range of angles of between about 2° and 5°. Similar values apply for angle D of bit 300 shown in FIG. 7 and used for stainless steel or aluminized metal tube. Best results are achieved with angle D equal to 3°, but significant improvement is encountered in the general range of angular values of 2° to 5°.

Bit 200 in FIGS. 5 and 6 and bit 300 of FIG. 7 are composed of carbide steel material. The carbide steel used provides for a strong bit providing a long-life for the tool edge portions and low friction on its faces for increased scarfing efficiency. The carbide steel used contains amounts of titanium, cobalt, and tantalum.

Although there has been illustrated and described a preferred embodiment of the invention, it will be understood that changes in the construction and operation disclosed may be made without departing from the spirit of the invention or the scope of the appended claims.

What is claimed is:

1. A tube finishing operation comprising:
   a generally rearwardly moving tube being formed substantially continuously, said tube having a weld bead thereon; and
   an apparatus for scarfing the weld bead from the rearwardly moving continuously formed tube, said apparatus comprising:
   movable means supported for generally rotative movement with respect to the tube; and
   power means for applying a rotary motion to said moveable means;
   tool bit means supported on the movable means for movement therewith with respect to the tube, said tool bit means engaging the tube for scarfing the weld bead therefrom as the movable means is moved relative to the tube;
   control means coupled to said power means for imparting oscillatory rotational movement with a rotational range of less than 360 degrees to said movable means and said tool bit means, whereby said tool bit means scarfs the weld bead back and forth to remove the bead and polish the scarfed surface;
   the tool bit means comprising:
   a forwardly facing first face portion extending generally away from the tube; a second face portion connected with the first face portion and extending rearward therefrom facing said tube;
   said first and second face portions together forming a generally arcuate tooling portion engaging the tube for scarfing the weld bead therefrom;
   said tool bit means having first and second portions thereon, and the generally arcuate tooling portion being between said portions and defining a concavity in the tool bit means, the tooling portion having generally the shape of an arc of less than 360 degrees of a circle and engaging the tube during oscillation of the movable means;
   said first and second portions defining a space therebetween communicating with the concavity and the tooling portion;
   said first and second portions being spaced apart widely enough to enable the tube to pass through the space therebetween and into the concavity to engage the tooling portion whereby the tool bit means may be mounted on and removed from the movable means by passing the first and second portions around the tube without removing the tube from the apparatus; and said second face portion sloping upwardly and rearwardly at an acute angle with respect to the upper surface of the tube for reducing friction of the bit on the tube and increasing the efficiency of the scarfing action.

2. The invention according to claim 1, and
said acute angle being generally in the range of 1° to 10° to reduce friction of the bit on the tube without causing chatter.

3. The invention according to claim 1, and
said acute angle being generally in the range of 2 to 5 degrees to reduce friction of the tool bit means on the tube without causing chatter.

4. The invention according to claim 1, and
said acute angle being approximately 3°.

5. The invention according to claim 1, and
said first face portion defining a forward facing surface extending rearwardly and away from the tooling portion and defining with the tube a second angle generally in the range of 108° to 112° for facilitating flow of the separated weld bead over the front face.

6. The invention according to claim 4, and
said tube being formed of ferritic stainless steel.

7. The invention according to claim 4, and
said tube being formed of a material selected from the group consisting of stainless steel, aluminized steel, and galvanized steel.

8. The invention according to claim 1, and
said first face portion being no rougher than 12 to 20 microinches for facilitating flow of the separated weld bead over the first face portion; and
said second face portion being no rougher than 24 to 30 microinches for providing with the first face portion a tooling edge on the tool bit means which is free of irregularities.

9. The invention according to claim 1, and
said tool bit means being formed of carbide steel containing tantalum, titanium, and cobalt.

10. The invention according to claim 1, and
the second face portion defining a substantially conical surface whereby the acute angle between the second face portion and the tube remains substantially constant throughout the movement of the tool bit means.

11. A tube finishing operation comprising:
a generally rearwardly moving tube being formed substantially continuously and having a weld bead; and
an apparatus for scarfing the weld bead from the tube, said apparatus comprising:
movable means supported for generally rotative movement with respect to the tube; and
power means for applying a rotary motion to said movable means;
tool bit means supported on the movable means for movement therewith with respect to the tube;
control means coupled to said power means for imparting oscillatory rotational movement with a rotational range of less than 360 degrees to said movable means and said tool bit means whereby said tool bit means scarfs the weld bead back and forth to remove the bead and polish the scarfed surface;
said tool bit means having:
first and second portions on said tool bit means;
a generally arcuate tooling portion being between said portions and defining a concavity in the tool bit means, the tooling portion having generally the shape of an arc of less than 360 degrees and engaging the tube during oscillation of the movable means for scarfing the weld bead;
said first and second portions defining a space therebetween communicating with the concavity and the tooling portion;
said first and second portions being spaced apart widely enough to enable the tube to pass through the space therebetween and into the concavity to engage the tooling portion whereby the tool bit means may be mounted on and removed from the movable means without removing the tube from the apparatus by passing the first and second portions around the tube;
a forwardly facing first face portion connected with the tooling portion and extending generally rearwardly and away from the tube;
said first face portion and the tube defining an angle therebetween, said angle being generally in the range of 106 to 116 degrees for enhancing flow of the separated weld bead over the first face portion and improving the efficiency of the scarfing action.

12. The invention according to claim 11, and
said angle being generally in the range of 108° to 112°.

13. The invention according to claim 11, and
said angle being approximately 111°.

14. The invention according to claim 11, and
the tube being formed of a material selected from the group consisting of stainless steel, aluminized steel, and galvanized steel.

15. The invention according to claim 11, and
said tube being composed of stainless steel including the ingredients carbon, manganese, and chromium.

16. The invention according to claim 11, and
said tube being composed of stainless steel including the following ingredients generally within the following percentage ranges:
carbon: 0% to 0.20%;
managanese: 0% to 1.5%;
silicon: 0% to 1.1%; and
chromium: 10% to 27%.

17. The invention according to claim 16, and
said stainless steel also including the following ingredients within the following percentage ranges:
phosphorus: 0% to 0.06%;
sulfur: 0% to 0.06%; and
titanium: 0% to 0.75%.

18. The invention according to claim 17, and
said stainless steel including the following ingredients generally within the following ranges:
carbon: 0% to 0.08%;
manganese: 0% to 1%;
silicon: 0% to 1%;
chromium: 10.5 to 12%;
phosphorus: 0% to 0.045%;
sulfur: 0% to 0.045%; and
titanium: generally in the range of from six times the percentage of carbon to 0.75%.

19. The invention according to claim 11, and
said first face portion being no rougher than 12 to 20 microinches for enhancing chip flow over the face portion.

20. The invention according to claim 19, and said tool bit means further having a second face portion connected with the tooling portion and extending generally rearwardly therefrom and facing the tube.

21. The invention according to claim 20, and
said second face portion being no rougher than 24 to 30 microinches to provide a tooling edge on the tool bit means which is free of irregularities.

22. The invention according to claim 20, and
said second face portion and the tube defining an acute angle therebetween.

23. The invention according to claim 11, and
said tool bit means being formed of carbide steel containing tantalum, titanium and cobalt.

24. A tube finishing operation comprising:
a tube having a weld bead thereon; and
an apparatus for scarfing the tube, said apparatus comprising:
movable means supported for generally rotative movement with respect to the tube; and
power means for applying a rotary motion to said movable means;
a tool bit means supported on the movable means for movement therewith with respect to the tube;
control means coupled to said power means for imparting oscillatory rotational movement with a rotational range of less than 360 degrees to said movable means and said tool bit means, whereby said tool bit means scarfs the weld back and forth to remove the bead and polish the scarfed surface;
said tool bit means having:
a first face portion facing generally forward and extending generally away from the tube; and
a second face portion connected with the first face portion and extending generally rearwardly therefrom, said second face portion generally facing the tube;
said first and second face portions together forming a tooling edge on said tool bit means;
said tooling edge engaging the tube for scarfing the weld bead therefrom;
first and second end portions on the tool bit means;
the tooling edge being generally arcuate and extending between said end portions and defining a concavity in the tool bit means, the tooling edge having generally the shape of an arc of less than 360 degrees of a circle and engaging the tube during oscillation of the movable means;
said first and second end portions defining a space therebetween communicating with the concavity and the tooling edge;
said first and second end portions being spaced apart widely enough to enable the tube to pass through the space therebetween and into the concavity to engage the tooling edge whereby the tool bit means may be mounted on and removed from the movable means by passing the first and second portions around the tube without removing the tube from the apparatus;
said first face portion being no rougher than 12 to 20 microinches to facilitate flow of separated weld bead over the first face portion;
said second face portion being no rougher than 24 to 30 microinches whereby the tooling edge is free of irregularities which would tend to mark the tube as it is scarfed.

25. The invention according to claim 24, and
the tool bit means being formed of carbide steel containing tantalum, titanium and cobalt.

26. In a scarfing tool for removing a weld bead from a tubular member, a combination of a tool bit holder and a tool bit, said holder comprising:
a plate member having proximal and frontal sides and provided with an opening for the passage of said tubular member through said holder,
the proximal side being adapted for securement to an end of a hollow spindle,
said frontal side having an undercut portion extending across the width of said holder, the remaining portion of said holder defining an overhang,
an arcuate seat formed in the central portion of the overhang and extending beyond each side of said opening,
said tool bit having an arcuate shape complementarily fitted into said seat,
clamp members, one on each side of said opening, secured to said overhang and abutting ends of said tool bit for securing said tool bit in said seat, and
first and second coacting locating means on the spindle and on the tool holder respectively for ensuring correct orientation of the tool holder with respect to the spindle when the scarfing tool is assembled.

27. The invention according to claim 26, and
one of the coacting locating means comprising a locating member and
the other of the coacting means comprising an aperture means receiving the locating member only when the tool holder is correctly oriented with respect to the spindle.

28. A tube finishing operation comprising:
a generally rearwardly moving tube having a weld bead;
said tube being formed of stainless steel;
an apparatus for scarfing the weld bead from the tube, said apparatus comprising:
movable means supported for generally rotative movement with respect to the tube; and
power means for applying a rotary motion to said movable means;
tool bit means supported on the movable means for movement therewith with respect to the tube;
said tool bit means being formed of carbon steel containing tantalum, titanium, and cobalt;
control means coupled to said power means for imparting oscillatory rotational movement with a rotational range of less than 360 degrees to said movable means and said tool bit means whereby said tool bit means scarfs the weld bead back and forth to remove the bead and polish the scarfed surface;
said tool bit means having:
first and second portions on said tool bit means;
a generally arcuate tooling portion being between said portions and defining a concavity in the tool bit means, the tooling portion having generally the shape of an arc of less than 360 degrees and engaging the tube during oscillation of the movable means for scarfing the weld bead;
said first and second portions being spaced apart widely enough to enable the tube to pass through the space therebetween and into the concavity to engage the tooling portion whereby the tool bit means may be mounted on and removed from the movable means without removing the tube from the apparatus by passing the first and second portions around the tube;

a forwardly facing first face portion connected with the tooling portion and extending generally rearwardly and away from the tube;

said first face portion and the tube defining an angle therebetween, said angle being generally within the range of 110 degrees to 112 degrees for enhancing flow of the separated weld bead over the first face portion and improving the efficiency of the scarfing action.

29. The invention according to claim 28, and
said first face portion being no rougher than 12 to 20 microinches for facilitating flow of the separated weld bead over the first face portion.

30. The invention according to claim 28, and
said tube being formed of ferritic stainless steel.

31. The invention according to claim 28, and
said tube being formed of stainless steel including the following ingredients generally within the following percentage range:
carbon: 0% to 0.20%;
manganese: 0% to 1.5%;
silicon: 0% to 1.1%;
chromium: 10% to 27%.

32. The invention according to claim 28, and
said tube being formed of stainless steel including the following impredients generally within the following percentage range:
carbon: 0% to 0.08%;
manganese: 0% to 1%;
silicon: 0% to 1%;
chromium: 10.5 to 12%;
phosphorus: 0% to 0.045%;
sulfur: 0% to 0.045%; and
titanium: generally in the range of from six times the percentage of carbon to 0.75%.

* * * * *